US011493116B2

(12) United States Patent
Nakatomi et al.

(10) Patent No.: US 11,493,116 B2
(45) Date of Patent: Nov. 8, 2022

(54) MICRO HEAD AND STAGE MECHANISM USING THE SAME

(71) Applicant: BIBLIOS Co., LTD., Tokyo (JP)

(72) Inventors: Yoshiharu Nakatomi, Tokyo (JP); Takeshi Onodera, Tokyo (JP); Shinji Suzuki, Tokyo (JP)

(73) Assignee: BIBLIOS Co., LTD., Tokyo (JP)

( * ) Notice: Subject to any disclaimer, the term of this patent is extended or adjusted under 35 U.S.C. 154(b) by 0 days.

(21) Appl. No.: 16/966,902

(22) PCT Filed: Oct. 1, 2019

(86) PCT No.: PCT/JP2019/038801
§ 371 (c)(1),
(2) Date: Aug. 3, 2020

(87) PCT Pub. No.: WO2020/188865
PCT Pub. Date: Sep. 24, 2020

(65) Prior Publication Data
US 2021/0108708 A1  Apr. 15, 2021

(30) Foreign Application Priority Data

Mar. 15, 2019  (JP) .............................. JP2019-048638

(51) Int. Cl.
F16H 25/20 (2006.01)
G01B 3/18 (2006.01)
(52) U.S. Cl.
CPC ........... F16H 25/2003 (2013.01); G01B 3/18 (2013.01)
(58) Field of Classification Search
CPC ............. F16H 25/2003; F16H 25/2006; F16H 25/2009; G01B 3/18; G12B 5/00; B23Q 1/58; B23Q 1/62; B23Q 1/262; B23Q 1/054; B23Q 1/52; G02B 21/26
USPC .................................................. 359/391, 393
See application file for complete search history.

(56) References Cited

U.S. PATENT DOCUMENTS 3,698,090 A * 10/1972 Parone ..................... G01B 3/18
33/816
3,727,471 A * 4/1973 Botos ....................... G05G 1/00
33/811
4,532,711 A    8/1985 Shirai
4,787,148 A * 11/1988 Myer ....................... G01B 3/18
33/814

(Continued)

FOREIGN PATENT DOCUMENTS

JP   H05-278159 A    10/1993
JP   H0811068 A *    1/1996 ............. C07K 14/31

(Continued)

OTHER PUBLICATIONS

Extended European Search Report dated Apr. 6, 2021.

Primary Examiner — Jake Cook
Assistant Examiner — Gregory Robert Weber
(74) Attorney, Agent, or Firm — Yokoi & Co., U.S.A.; Toshiyuki Yokoi

(57) ABSTRACT

Provided is a micro head having a simple structure and yet entailing extremely little backlash.
A micro head includes a spindle, a sleeve, a thimble, a backlash absorbing member, and a collar, wherein the cylindrical backlash absorbing member is fixed to the sleeve in a state where the spindle is inserted at a position in the sleeve.

8 Claims, 8 Drawing Sheets

(56) References Cited

U.S. PATENT DOCUMENTS

| | | | | |
|---|---|---|---|---|
| 5,433,016 A * | 7/1995 | Tachikake | ................ | G01B 3/18 |
| | | | | 33/703 |
| 5,725,341 A * | 3/1998 | Hofmeister | ........... | F16B 13/061 |
| | | | | 411/258 |
| 5,771,749 A * | 6/1998 | Yoneyama | ................ | B25J 7/00 |
| | | | | 359/392 |
| 6,673,875 B2 * | 1/2004 | Attarwala | ................ | C09J 4/06 |
| | | | | 525/450 |
| 6,781,753 B2 * | 8/2004 | Gunderson | ............ | G02B 21/26 |
| | | | | 359/391 |
| 2002/0129503 A1 * | 9/2002 | Botos | ...................... | B23Q 1/58 |
| | | | | 33/1 M |
| 2010/0005676 A1 | 1/2010 | Fujikawa et al. | | |
| 2011/0252659 A1 | 10/2011 | Tsuji | | |
| 2018/0031091 A1 * | 2/2018 | Wu | ........................ | F16H 25/20 |

FOREIGN PATENT DOCUMENTS

| | | | | |
|---|---|---|---|---|
| JP | 2010-19783 A | 1/2010 | | |
| JP | 2010-210556 A | 9/2010 | | |
| JP | 2011-226839 A | 11/2011 | | |
| JP | 2012251854 A * | 12/2012 | | |
| JP | 2015000460 A * | 1/2015 | | |
| WO | 2011/152109 A | 12/2011 | | |
| WO | WO-2011152109 A1 * | 12/2011 | ............... | G12B 5/00 |

* cited by examiner

Related Art

Related Art

MICRO HEAD AND STAGE MECHANISM USING THE SAME

TECHNICAL FIELD

The present invention relates to a micro head and a stage mechanism using the same.

Particularly, the invention relates to a micro head and a stage mechanism using the micro head having a simple structure and yet entailing extremely little backlash.

BACKGROUND ART

In general, a micro head is a feed mechanism capable of fine feed in units of several micrometers and a structure in which a male screw provided on a spindle and a female screw provided on a sleeve are screwed together to move on a shaft.

In the related art, various types of micro heads have been proposed that improve responsiveness and repeatability by reducing, for example, the backlash between a spindle and a sleeve (spindle support tube) and twisting applied to the spindle.

For example, proposed is a micro head reducing backlash by including a pressurizing ring having a female screw portion screwed into the male screw portion of a spindle, a pressurizing spring performing biasing in a direction in which the pressurizing ring and a sleeve are separated from each other, and an adjusting nut sandwiching the pressurizing spring with the pressurizing ring (see Patent Document 1).

More specifically, the micro head that is exemplified in FIG. 7 has been proposed.

A micro head 100a includes a spindle support tube 120 having an inner peripheral surface where a female screw portion is formed and a spindle 110a having an outer peripheral surface having a male screw portion screwed into a female screw portion 121 of the spindle support tube 120.

In addition, the micro head 100a includes a pressurizing ring 160 having a female screw portion 161 screwed into the male screw portion of the spindle and a pressurizing spring 170 inserted between the pressurizing ring 160 and the spindle support tube 120 on the outer periphery of the spindle and biasing the pressurizing ring 160 in a direction of separation with respect to the spindle support tube 120.

Further, a through hole for penetration in the axial direction of the spindle 110a is formed at the outer peripheral edge of the pressurizing ring 160. The through hole is engaged, so as to be axially displaceable, with an engagement pin 180 connected to the spindle support tube 120 in parallel with the axial direction.

Accordingly, the adjusting nut 150 and the pressurizing ring 160 are capable of reducing backlash by acting as a double nut.

Also proposed is a micro head preventing, for example, a spindle from twisting by a male screw portion having the same pitch as the male screw portion of the spindle being formed on the outer peripheral surface of a fixed sleeve and a female screw portion screwed into the male screw portion of the fixed sleeve being formed on the inner peripheral surface of a thimble (see Patent Document 2).

More specifically, the micro head that is exemplified in FIG. 8 has been proposed.

FIG. 8A is a plan view of a micrometer 200, and FIG. 8B is a cross-sectional view of a micro head 200a taken along line A-A in FIG. 8A.

The micro head 200a includes a spindle 210, a fixed sleeve 220, a thimble 230, and an operation sleeve 240. The fixed sleeve 220 includes a female screw portion 221 screwed into a male screw portion 210a of the spindle 210 and a male screw portion 223 screwed into a female screw portion 231 of the thimble 230.

When the operation sleeve 240 is rotated in this micro head 200a, the spindle 210 moves along the axial direction thereof.

On the other hand, when a non-original force such as a twisting force and a radial force is applied to the operation sleeve 240 in the micro head 200a, the force is also transmitted to the thimble 230. However, the thimble 230 includes the female screw portion 231 screwed into the male screw portion 223 of the fixed sleeve 220, and thus the non-original force transmitted to the thimble 230 is received by the fixed sleeve 220.

Accordingly, the twisting or radial force is not applied to the spindle 210, and thus it is possible to reduce a variation factor of a measured value and improve repeatability.

CITATION LIST

Patent Documents

Patent Document 1: JP 2010-210556 A
Patent Document 2: JP 2011-226839 A

DISCLOSURE OF THE INVENTION

Problems to be Solved by the Invention

However, the pressurizing spring 170 is used between the adjusting nut 150 and the pressurizing ring 160 in the case of the micro head disclosed in Patent Document 1, and thus application of a force exceeding the elastic force thereof has resulted in the problem that no backlash reduction effect is obtainable.

In addition, the adjusting nut 150 and the pressurizing ring 160 as well as the spindle support tube 120 need to have a screw structure, and thus the problem has arisen that the entire micro head becomes structurally complex.

In addition, in the case of the micro head disclosed in Patent Document 2, the backlash of the spindle 210 is not considered at all although it is described that the non-original force can be reduced by the fixed sleeve 220 and the female screw portion 231 of the thimble 230.

In other words, the structure in which each of the spindle 210 and the thimble 230 rotates and moves along the axial direction as the operation sleeve 240 rotates has led to the problems of ineffective backlash reduction and poor responsiveness with respect to the operation of the operation sleeve 240.

In addition, backlash exists between the spindle 210 and the fixed sleeve 220 and between the fixed sleeve 220 and the thimble 230, and thus the problems have arisen that weak stress acts between the male and female screws and deviation results from unintended vibration or the like without a lock mechanism.

In this regard, the inventors of the invention have completed the invention by finding as a result of earnest studies that it is possible to extremely reduce backlash by including a spindle, a sleeve, a thimble, and a backlash absorbing member fixed to the sleeve.

In other words, an object of the invention is to provide a micro head and a stage mechanism using the micro head having a simple structure and yet entailing extremely little backlash.

Means for Solving Problem

According to the invention, a micro head includes a spindle having a male screw portion, a sleeve incorporating the spindle, a thimble where a part of the sleeve is inserted, the thimble being rotatable about the sleeve as an axis of rotation and partially connected to one end of the spindle, and a cylindrical backlash absorbing member fixed to the sleeve in a state where the spindle is inserted at a position in the sleeve facing the male screw portion of the spindle.

With this configuration, it is possible to exert a backlash absorption action on the male screw portion of the spindle. Accordingly, it is possible to realize the micro head having a simple structure in which the thimble and the spindle are directly connected and entailing extremely little backlash.

In addition, in configuring the invention, it is preferable that the backlash absorbing member is a resinous member having a through hole having a predetermined diameter allowing penetration by the spindle.

With this configuration, it is possible to obtain a backlash absorption effect utilizing resin characteristics.

In addition, in configuring the invention, it is preferable that the backlash absorbing member is fixed to the sleeve by an anaerobic adhesive.

With this configuration, it is possible to perform desired adhesion with the adhesion object placed in an air shutoff atmosphere after the backlash absorbing member is moved to a predetermined position in the sleeve.

In addition, although it is necessary to provide the backlash absorbing member at a predetermined position inside the sleeve in manufacturing the micro head, it is possible to prevent the adhesive from curing while the backlash absorbing member is inserted into the sleeve.

In addition, in configuring the invention, it is preferable that a metallic protective cover is provided on a periphery of the backlash absorbing member.

With this configuration, it is possible to improve, for example, the durability of the backlash absorbing member. This preferred example having the metallic protective cover is particularly useful in a case where the backlash absorbing member is a resinous member. Resinous members are generally lower in strength than metallic members, and thus the usefulness of the metallic protective cover becomes remarkable.

In addition, in configuring the invention, it is preferable that two or more units of the backlash absorbing member are provided.

With this configuration, it is possible to improve backlash absorbability as compared with a case where one backlash absorbing member is used.

In addition, in configuring the invention, it is preferable that the two or more backlash absorbing members are continuously disposed along the spindle.

With this configuration, it is not necessary to separate the backlash absorbing members from each other, and thus manufacturing is facilitated.

In addition, in configuring the invention, it is preferable that the two or more backlash absorbing members are spaced apart from each other.

With this configuration, it is possible to provide backlash absorbability at a plurality of separate locations on the spindle, and thus backlash can be more effectively reduced.

In addition, in configuring the invention, it is preferable that a collar in contact with the backlash absorbing member is provided in the sleeve.

With this configuration, it is possible to perform stable manufacturing by guiding the disposition of the backlash absorbing member at a predetermined position and pushing the backlash absorbing member into the sleeve by means of the collar.

In addition, a stage mechanism according to another aspect of the invention includes a predetermined micro head, a fixed stage, a movable stage provided on the fixed stage, a first connection portion connecting the sleeve of the micro head and the fixed stage, and a second connection portion connecting the spindle of the micro head and the movable stage.

With this configuration, it is possible to realize the stage mechanism having the movable stage in which backlash is extremely reduced.

In addition, in configuring another aspect of the invention, it is preferable that the second connection portion includes a screw hole provided in a tip portion of the spindle, a member having a through hole having a predetermined diameter and fixed to the movable stage, and a screw member having a diameter smaller by a predetermined tolerance than the predetermined diameter and screwed into the screw hole through the through hole.

With this configuration, radial shaking of the spindle can be effectively prevented and a smooth axial movement is possible.

MODE(S) FOR CARRYING OUT THE INVENTION

Figure 1A:
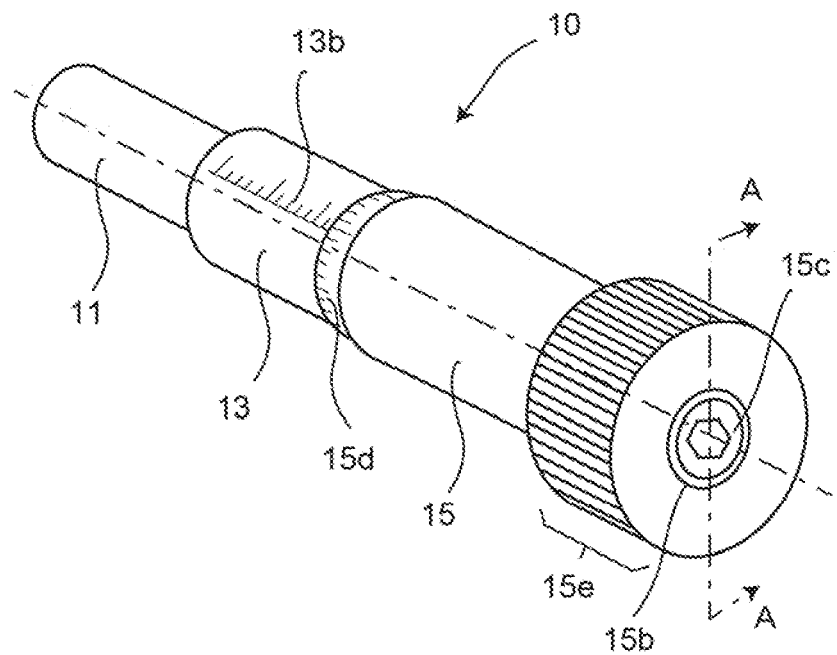
FIG. 1A is a perspective view of a micro head of an embodiment.

Embodiments of a micro head and a stage mechanism using the same of the invention will be described below with reference to the drawings. It should be noted that the drawings used for the description are merely schematically illustrated to the extent that the invention can be understood.

In addition, similar components are denoted by the same reference numerals and description thereof may be omitted in the drawings used for the description. In addition, the shapes, dimensions, materials, and so on described in the following description are merely preferred examples within the scope of the invention. Accordingly, the invention is not limited to the following embodiments.

First Embodiment

As illustrated in FIGS. 1 and 2, the micro head of the first embodiment includes a spindle 11, a sleeve 13, a thimble 15, a backlash absorbing member 17, and a collar 19.

Figure 1B:
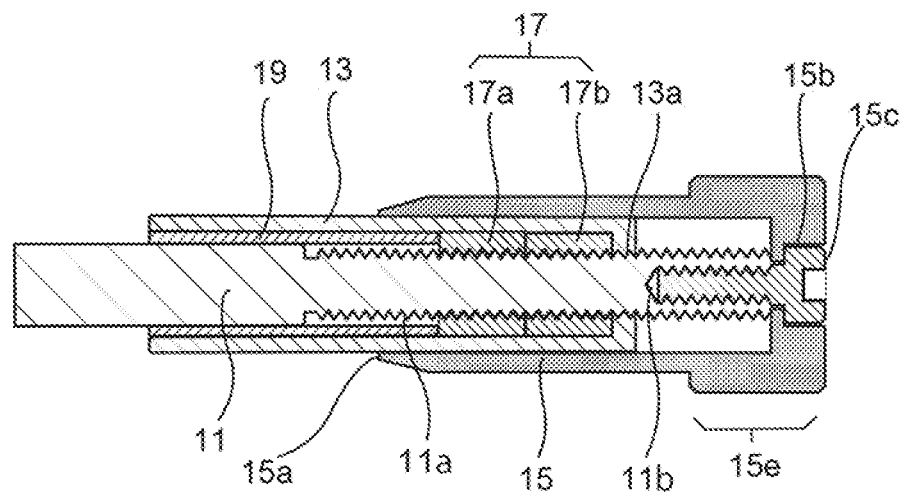
FIG. 1B is a cross-sectional view of the micro head taken along line A-A in FIG. 1A.
Figure 2A:
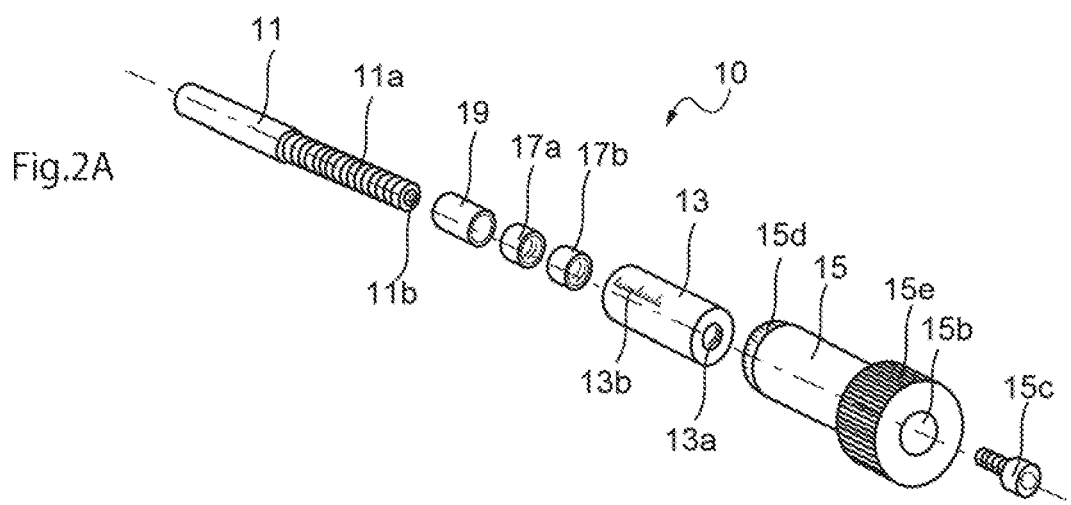
FIG. 2A is an exploded perspective view of the micro head of the embodiment.
Figure 2B:
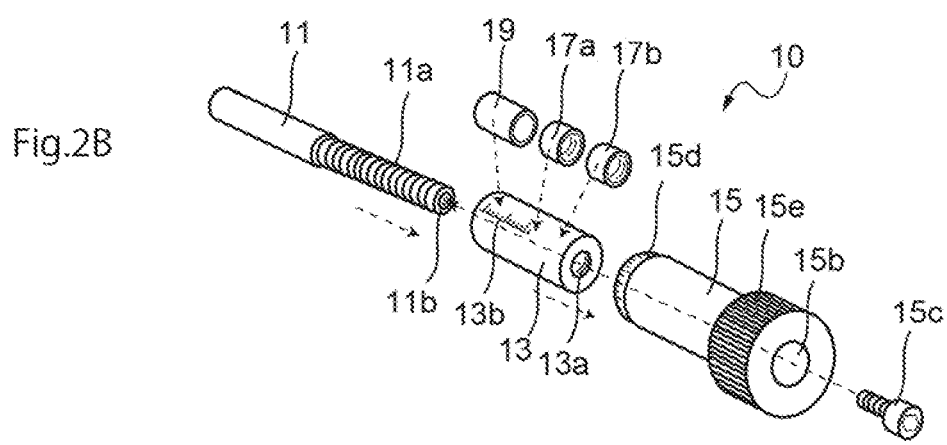
FIG. 2B is an exploded perspective view mainly illustrating the disposition relationship of a collar and two backlash absorbing members.

FIG. 1A is a perspective view of a micro head 10 of the embodiment, and FIG. 1B is a cross-sectional view of the micro head 10 taken along line A-A in FIG. 1A. In addition, FIGS. 2A and 2B are exploded perspective views of the micro head 10.

Details and mutual relationships of the components will be described below.

1. Spindle

The spindle 11 is a substantially columnar member and has a male screw portion 11a at a desired part on the outer periphery thereof. The spindle 11 may be made of any suitable metal material. Examples of the metal material include stainless steel, high carbon chromium bearing steel, alloy tool steel, and cast iron.

Specific examples of the stainless steel include SUS304 and any suitable stainless steel defined in JIS G4303.

Specific examples of the high carbon chromium bearing steel include the SUJ2, SUJ3, SUJ4, and SUJ5 defined in JIS G4805.

Specific examples of the alloy tool steel include the SKS, SK, SKD, and SKT materials defined in JIS G4404.

Specific examples of the cast iron include any suitable cast iron such as so-called ordinary cast iron and alloy cast iron.

In this embodiment, the spindle 11 is made of high carbon chromium bearing steel. This material is more preferable because the material has excellent physical properties such as Brinell hardness and excellent compatibility with another member in terms of coefficient of thermal expansion and so on.

2. Sleeve

The sleeve 13 is a cylindrical member. The spindle 11 is incorporated in the sleeve 13.

The sleeve 13 may be made of any suitable metal material. Examples of the metal material include stainless steel, carbon tool steel, alloy tool steel, chrome steel, and manganese steel. In this embodiment, the sleeve 13 is made of alloy tool steel (SKT6). This material is more preferable because the material has excellent physical properties such as Brinell hardness and excellent compatibility with another member in terms of coefficient of thermal expansion and so on.

In addition, a female screw portion 13a may be formed integrally with the sleeve 13 or may be individually formed and fixed in the sleeve depending on the design of the micro head. In the case of this embodiment, the female screw portion 13a is integrally formed by one end of the sleeve 13 being machined into the female screw portion 13a corresponding to the male screw portion 11a of the spindle 11.

In addition, it is preferable that a predetermined main scale 13b (see FIG. 1A) is provided at an appropriate place on the outer peripheral surface of the sleeve 13 so that the amount of axial spindle movement is represented.

3. Thimble

The thimble 15 is a cylindrical member having an opening portion 15a at one end. The thimble 15 is a member in which a part of the sleeve 13 is inserted from the opening portion 15a side in a predetermined fitting condition. The thimble 15 is rotatable with respect to the sleeve 13 with the sleeve 13 used as an axis of rotation.

Moreover, the thimble 15 is a member connected to one end of the spindle 11 on the end surface that is on the side opposite to the opening portion 15a. Specifically, in the case of this embodiment, a screw head-stopping counterbore portion 15b through which a screw is capable of passing is provided in the end portion of the thimble 15 that is on the side opposite to the opening portion 15a. In addition, a screw hole 11b is provided along the axial direction in one end surface of the spindle 11. Further, the thimble 15 and the spindle 11 are firmly connected by means of the counterbore portion 15b and the screw hole 11b and by a fixing screw such as a hexagonal screw 15c. Accordingly, the micro head 10 has a structure in which the spindle 11 and the thimble 15 are directly connected.

In addition, it is preferable that a predetermined sub scale 15d (see FIG. 1A) is provided along the outer periphery in the end portion of the thimble 15 on the opening portion 15a side so that the degree of rotation from any position is represented.

In addition, the end portion of the thimble 15 of this embodiment that is opposite to the opening portion 15a is larger in diameter than other parts. Moreover, an operation knob 15e is formed by knurling of the outer peripheral surface of the large-diameter part. This is to enhance the operability of the micro head 10.

The thimble 15 may be made of any suitable metal material. Examples of the metal material include stainless steel, aluminum, carbon tool steel, alloy tool steel, chrome steel, and manganese steel. In this embodiment, the thimble 15 is made of alloy tool steel (SKT6). This material is more preferable because the material has excellent physical properties such as Brinell hardness and excellent compatibility with another member in terms of coefficient of thermal expansion and so on.

4. Backlash Absorbing Member (1) Basic Configuration

The backlash absorbing member 17 is a cylindrical member in which the spindle 11 is inserted. Specifically, for example, the backlash absorbing member 17 is a cylindrical member having a through hole (17ya in FIG. 3A) into which the spindle 11 is inserted. Moreover, the backlash absorbing member 17 is a member fixed to the sleeve 13 at the position in the sleeve 13 that faces the male screw portion 11a of the spindle 11. Accordingly, the backlash absorbing member 17 is a structure that is in contact with the spindle 11 at the male screw portion 11a part of the spindle 11.

In addition, it is also preferable that the backlash absorbing member 17 is a cylindrical member having a female screw portion corresponding to the male screw portion 11a of the spindle 11 on a cylindrical inner surface.

Alternatively, the backlash absorbing member 17 may not be in contact with the spindle 11 depending on the design. Considering the expansion, contraction, and the like of the backlash absorbing member 17 and the spindle 11, the backlash absorbing member 17 may be close to the spindle 11 with a predetermined tolerance and without contact.

Figure 3A:
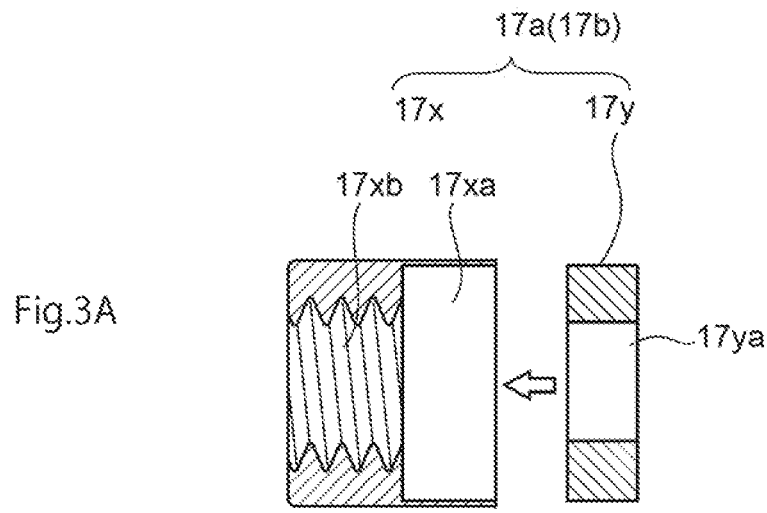
FIGS. 3A and 3B are a cross-sectional view and a perspective view for describing a metallic protective cover.
Figure 3B:
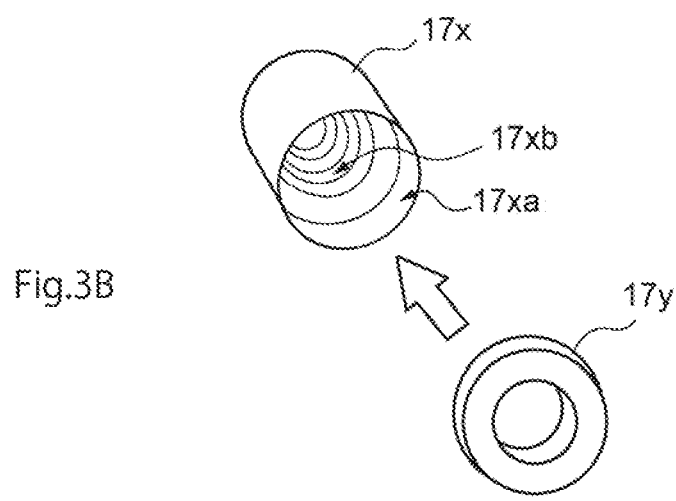
Figure 3C:
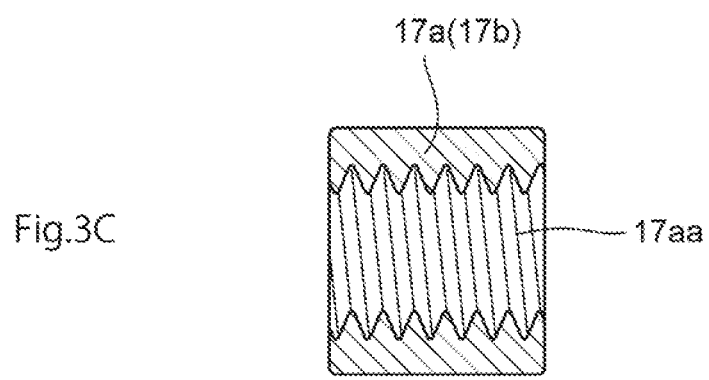
FIG. 3C is a cross-sectional view illustrating another example of the backlash absorbing member.

In addition, as illustrated in FIG. 3C and as will be described in detail later, a backlash absorbing member 17a itself may be a cylinder member having a female screw portion 17aa corresponding to the male screw of the spindle 11.

In the case of this embodiment, the backlash absorbing member 17a and a backlash absorbing member 17b are used as two backlash absorbing members. This point will also be described in detail later.

(2) Fixing Method

Next, a preferred example of how to fix the backlash absorbing member 17 (17a, 17b) and the collar 19 (described later) to the sleeve 13, a preferred example of the backlash absorbing member 17 (17a, 17b), and the action of the backlash absorbing member 17 (17a, 17b) will be sequentially described.

The backlash absorbing member 17 and the collar 19 may be fixed to the inner surface of the sleeve 13 by any suitable method. Preferably, an adhesive may be used for the fixing. More preferably, an anaerobic adhesive may be used for the fixing.

This is because the use of the anaerobic adhesive allows desired adhesion to be performed without heating or light irradiation and with the adhesion objects placed in an air shutoff atmosphere after the backlash absorbing member 17 and the collar 19 are installed at predetermined positions on the inner surface of the sleeve 13.

In other words, this is because the backlash absorbing member 17 and the collar 19 can be installed with respect to predetermined positions on the inner surface of the sleeve 13 regardless of adhesive material curing time and desired adhesion can be performed with the impact on parts other than the adhesive suppressed. The type of the anaerobic adhesive is not particularly limited, and examples thereof include TL42J (type name) manufactured by 3M and Loctite (trade name) manufactured by Henkel Corporation.

(3) Disposition

The backlash absorbing member 17 may be one or two or more in number. As described above, in the case of this embodiment, two backlash absorbing members constitute the backlash absorbing member 17, one being the first backlash absorbing member 17a and the other being the second backlash absorbing member 17b. It is preferable that the number is two or more because it is possible to devise, for example, disposition effective for backlash absorption when the number is two or more.

For example, the example illustrated in FIG. 2B is an example in which the two backlash absorbing members 17a and 17b are continuously disposed in the sleeve 13 and the collar 19 is disposed in the front of the sleeve 13.

In the case of this configuration, the backlash of the spindle can be intensively absorbed on the rear portion side or the front side depending on whether the cause of the backlash is on the tip side or the terminal side of the spindle.

Alternatively, although not illustrated, the two backlash absorbing members 17a and 17b may be spaced apart from each other without the above-described continuation. A configuration in which two or more backlash absorbing members are spaced apart from each other is effective in a case where backlash absorbability is required at a plurality of separate locations on the spindle.

Figure 2C:
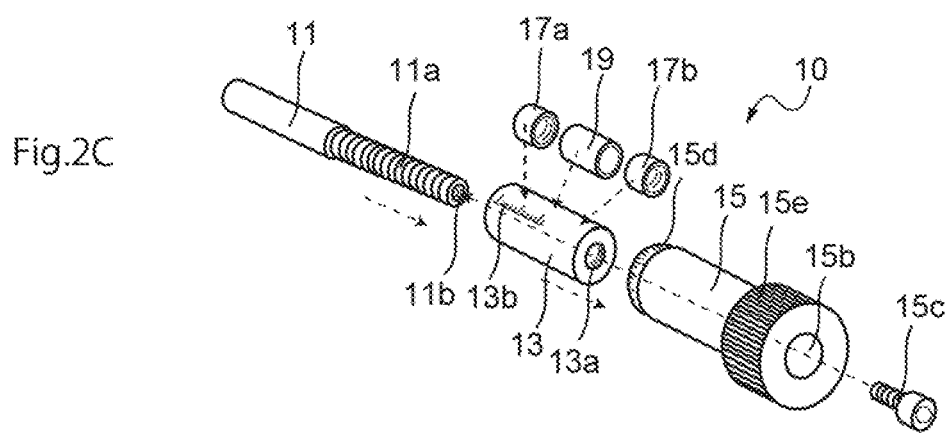
FIG. 2C is an exploded perspective view mainly illustrating another example of the disposition of the collar and the two backlash absorbing members.

In addition, the example illustrated in FIG. 2C is an example in which the two backlash absorbing members 17a and 17b are disposed so as to be divided across the collar 19.

In this example, the backlash of the spindle can be absorbed on both sides of the collar 19 of the sleeve 13, and thus backlash absorption can be evenly performed on both the tip side and the terminal side of the spindle.

It should be noted that the two backlash absorbing members 17a and 17b may be in contact with and sandwich the collar 19 or may be disposed somewhat apart from the collar 19 in the case of the example illustrated in FIG. 2C.

The first backlash absorbing member 17a and the second backlash absorbing member 17b may be identical or different in structure. In the case of this embodiment, the first backlash absorbing member 17a and the second backlash absorbing member 17b are structurally identical.

The following description focuses on the first backlash absorbing member 17a and covers details of the structure thereof. However, the generic reference of backlash absorbing member 17 may be used in the following description.

(4) Type

The backlash absorbing member 17 is a member for firmly holding the fixed state of the spindle 11 while suppressing the occurrence of backlash by satisfactorily ensuring the mobility of the spindle 11 and absorbing the stress that is generated in the spindle 11 or the like.

In other words, with the backlash absorbing member 17, it is possible to exhibit predetermined slipperiness during the sliding of the spindle 11 and prevent, for example, the rolling and twisting of the spindle 11 without hindering the sliding of the spindle 11. Further, when the spindle 11 is fixed, the backlash of the spindle 11 is reduced through moderate deformation, the stress that is generated in the spindle 11 or the like is absorbed, and the fixed state of the spindle 11 is firmly held.

Accordingly, as will be described in detail later, the backlash absorbing member 17 is preferably a cushioning member having a through hole (such as 17ya in FIG. 3) having a value within the range of 1 to 100 mm as a predetermined diameter.

Further, it is preferable that grease or lubricating oil is applied to the surface of the spindle 11 within the sliding range of the backlash absorbing member 17.

This is because it is possible to prevent screw thread or screw groove scraping and improve the durability of the backlash absorbing member 17 by reducing the force of friction with the backlash absorbing member 17 that is attributable to the rotation of the spindle 11.

It should be noted that any generally known method can be used for the grease or lubricating oil application to the spindle 11. Examples of the method include whole-surface application by means of a brush or the like and applying the grease or lubricating oil to a part of the spindle and then sliding and extending the spindle 11 with the spindle 11 and the backlash absorbing member 17 fitted together.

FIG. 3A is a cross-sectional view of the first backlash absorbing member 17a. The first backlash absorbing member 17a is preferably a cylindrical and resinous member having the through hole 17ya.

This is because manufacturing is facilitated as there is no need to consider directions and it is possible to obtain a backlash absorption effect utilizing resin characteristics when the first backlash absorbing member 17a is cylindrical.

In addition, this is because the resin during the rotation and sliding of the spindle 11 is melted by the frictional heat entailed by the sliding, satisfactory slipperiness is exhibited, and operation with a weaker force is possible.

Further, this is because the resin can be sufficiently solidified and the backlash absorbing member 17 can be locked at a predetermined position when the sliding of the spindle 11 is stopped.

Here, as described above, the diameter of the through hole 17ya is a diameter at which it is possible to exhibit predetermined slipperiness during the sliding of the spindle 11 and prevent, for example, the rolling and twisting of the spindle 11 without hindering the sliding of the spindle 11. Moreover, the diameter of the through hole 17ya is a diameter at which the backlash of the spindle 11 can be reduced through moderate deformation and the fixed state of the spindle 11 can be firmly held when the spindle 11 is fixed. The diameter is determined in view of the physical properties of the material constituting the backlash absorbing member.

In addition, the constituent material of the backlash absorbing member 17 is not particularly limited and it is preferable that the backlash absorbing member 17 is made of, for example, at least one of the resin materials of amide resin (nylon resin), urethane resin, ester resin, carbonate resin, acrylic resin, olefin resin, rubber-based resin (such as natural rubber, styrene rubber, butadiene rubber, styrene-butadiene-styrene block copolymer (SBS), styrene-isoprene-styrene block copolymer (SIS), and styrene-ethylene-butylene-styrene block copolymer (SEBS)), imide resin, amide-imide resin, phenoxy resin, polyether sulfone resin, polyether ether ketone resin, silicone resin, epoxy resin, cyanate resin, guanamine resin, urea resin, and phenolic resin.

With the backlash absorbing member 17 made of such a thermoplastic or thermosetting resin material, it is possible to enhance, for example, the formability and backlash absorbability of the backlash absorbing member 17 and obtain excellent mobility and fixability for the spindle 11.

Further, at least one of the amide resin (nylon resin), the urethane resin, and the rubber-based resin is a particularly suitable resin material because the material further ensures the balance between the mobility and the fixability of the spindle 11 and is excellent in terms of durability or the like as well.

In addition, usually and preferably, the glass transition point (in the case of amorphous resin) or the melting point (in the case of crystalline resin) of the constituent material (resin material) of the cushion resin member in the backlash absorbing member 17 is set to a value within the range of 30 to 250° C.

This is because the backlash absorbability or the fixability of the spindle 11 may decline due to a shortage of heat resistance or mechanical strength when the glass transition point or the melting point of the constituent material is a value of below 30° C.

In addition, this is because the resin material that can be used may be excessively limited in terms of type or the backlash absorbability may significantly decline when the glass transition point or the melting point of the constituent material is a value of above 250° C.

Accordingly, the glass transition point or the melting point of the constituent material of the backlash absorbing member 17 is more preferably a value within the range of 50 to 200° C. and even more preferably a value within the range of 80 to 180° C.

It should be noted that the glass transition point of the constituent material of the backlash absorbing member 17 can be measured as a point of change in specific heat in DSC measurement in compliance with JIS K7121 and can be measured as a DSC heat of fusion peak temperature when the constituent material has a melting point.

In addition, it is preferable that a metallic protective cover 17x having a predetermined form (described later) is provided on the periphery of the backlash absorbing member 17 as illustrated in FIG. 3A.

In other words, it is preferable to use the metallic protective cover 17x integrally including a cap-shaped accommodating portion 17xa accommodating a resinous backlash absorbing member 17y and a screw portion 17xb having a screw groove corresponding to the male screw portion 11a of the spindle 11 as illustrated in FIG. 3A. Further, it is preferable to configure the backlash absorbing member 17 by inserting the cylindrical-shaped resinous backlash absorbing member 17y into the cap-shaped accommodating portion 17xa.

This is because the backlash absorbing member 17 can be easily attached and fixed to a predetermined place of the sleeve 13, the durability of the backlash absorbing member 17 can be improved, and the mobility and fixability of the spindle 11 can be excellent for a long period of time by the metallic protective cover 17x being provided as described above.

(5) Action and Effect

Next, the action and effect in the stress absorption by the backlash absorbing members 17a and 17b will be described with reference to FIGS. 4A to 4C.

Figure 4A:
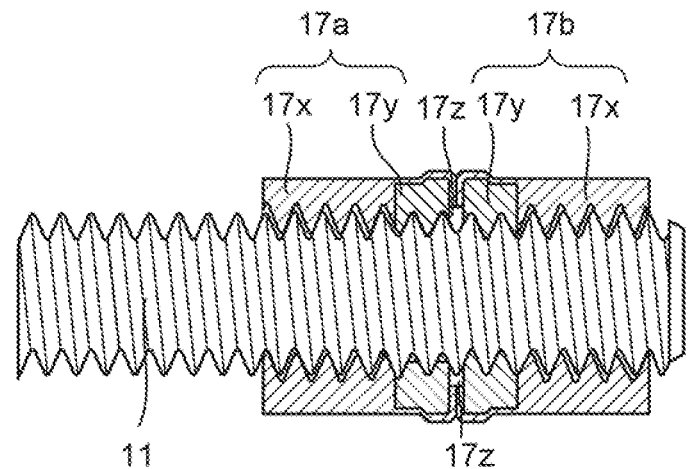
FIG. 4A is a diagram for describing the action and effect of the backlash absorbing member.

FIG. 4A is a cross-sectional view illustrating a state where the two backlash absorbing members 17a and 17b are attached to the spindle 11 and the two backlash absorbing members 17a and 17b have a configuration in which the metallic protective cover 17x is attached to the resinous backlash absorbing member 17y. However, the sleeve and the like are not illustrated in FIG. 4A.

Figure 4B:
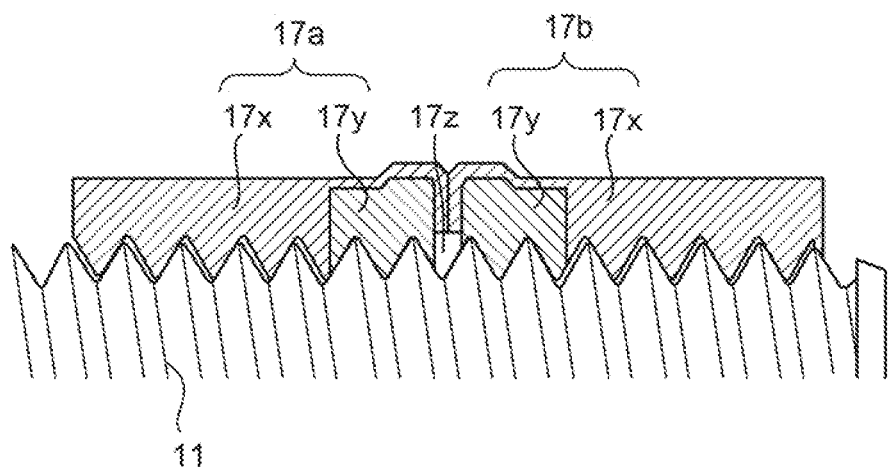
FIG. 4B is a partially enlarged view illustrating a part of FIG. 4A in an enlarged manner.

In addition, FIG. 4B is an enlarged view focusing on the two backlash absorbing members 17a and 17b illustrated in FIG. 4A. FIG. 4B illustrates a state where the respective metallic protective covers 17x face each other and the two backlash absorbing members 17a and 17b are disposed so as to be continuous.

Figure 4C:
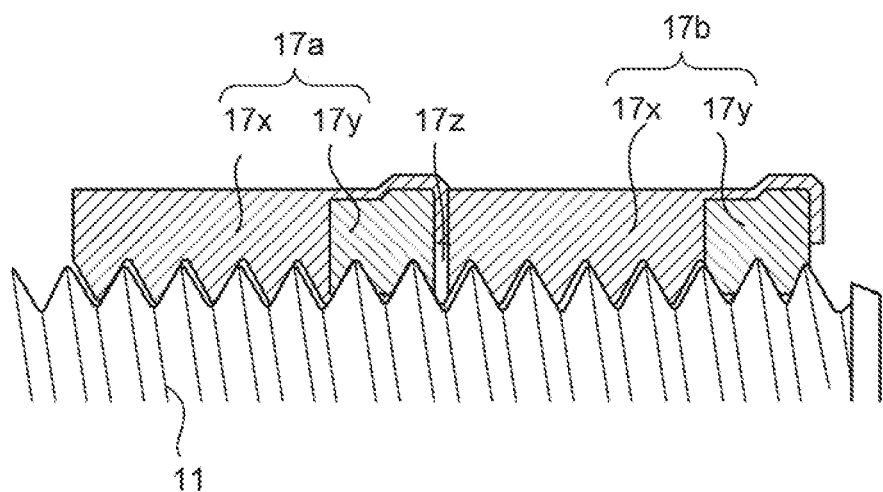
FIG. 4C is an enlarged view illustrating the configuration of another backlash absorbing member.

Further, FIG. 4C illustrates a state where the two backlash absorbing members 17a and 17b are disposed such that the metallic protective covers 17x face the spindle 11 in the same direction (rightward in the drawing).

Accordingly, during a rotational movement of the spindle 11 in a predetermined direction, the backlash absorbing members 17a and 17b made of a resin member exhibit predetermined slipperiness and it is possible to more effectively prevent, for example, the rolling and twisting of the spindle 11 without hindering the operation of the spindle 11.

In other words, although a rotational movement of the spindle 11 may result in a heat generation phenomenon, the two backlash absorbing members 17a and 17b are capable of more efficiently absorbing the heat that results from the heat generation phenomenon.

Accordingly, the predetermined slipperiness or the like can be exhibited as it is although the backlash absorbing members 17a and 17b may be partially plasticized by the absorbed heat.

Further, since the predetermined metallic protective cover 17x is provided on the periphery of the cylindrical resin member constituting the backlash absorbing members 17a and 17b, the backlash absorbing members 17a and 17b neither undergo excessive deformation nor flow out of a predetermined place.

On the other hand, the two backlash absorbing members 17a and 17b are moderately deformed and the backlash of the spindle 11 can be reduced when the rotational movement of the spindle 11 is stopped and the position of the spindle 11 is fixed with the two backlash absorbing members 17a and 17b provided as illustrated in FIGS. 4A to 4C.

In other words, the so-called double nut effect is exhibited even in a case where stress is exerted such that one of the two backlash absorbing members 17a and 17b is loosened.

Accordingly, the occurrence of loosening attributable to the two backlash absorbing members 17a and 17b is effectively prevented and it is possible to effectively absorb stress and firmly hold the fixed state even when the stress is applied from the outside so as to move the spindle 11.

Further, it is preferable that the two backlash absorbing members 17a and 17b are continuously provided and a space portion 17z surrounded by the resinous backlash absorbing member (cylindrical-shaped resinous backlash absorbing member) 17y, the metallic protective cover 17x, and the spindle 11 is created between the two backlash absorbing members 17a and 17b as illustrated in FIGS. 4A to 4C.

This is because it is possible to create a grease reservoir in the space and prevent the spindle 11 from running out of grease as the spindle 11 rotates and slides in a case where predetermined grease or lubricating oil for wear prevention is applied to the spindle 11.

In addition, in the above description, the backlash absorbing members 17a and 17b having a configuration in which the metallic protective cover 17x is attached to the resinous backlash absorbing member 17y have been described. Alternatively, a resinous cylinder member having the female screw portion 17aa corresponding to the male screw portion 11a of the spindle 11 (see FIG. 1B) as illustrated in FIG. 3C may be used as the backlash absorbing members 17a and 17b. The outer peripheral surface of the resinous cylinder member having the female screw portion 17aa may be used after fixing to the inner peripheral surface of the sleeve 13 by means of an adhesive. Use together with the collar 19 is preferable even in such a case. For example, in the case of a micro head using the collar 19 and one resinous cylinder member having the female screw portion 17aa, the radial torque of the thimble 15 is relatively light and the micro head is operated with ease.

5. Collar

As illustrated in FIG. 3, the collar 19 is preferably a cylindrical member having a hole into which the spindle 11 can be inserted and having an outer diameter corresponding to the inner diameter of the sleeve 13.

This is because radial positioning is not necessary when the outer diameter corresponds to the inner diameter of the sleeve and manufacturing is facilitated as there is no need to consider directions when the collar 19 is a cylindrical member.

The collar 19 may be made of any suitable metal material. Examples of the metal material include stainless steel and alloy tool steel.

The collar 19 and the two backlash absorbing members 17a and 17b are fixed in the sleeve 13. The collar 19 has a role as a shaft shake prevention member of the spindle 11 and is capable of more reliably performing an axial movement of the spindle 11.

In addition, the collar 19 also serves as a member pushing the two backlash absorbing members 17a and 17b into predetermined positions in the sleeve 13.

6. Metallic Protective Cover

Next, an example of suitable connection between the resinous backlash absorbing member 17y and the metallic protective cover 17x and the function of the backlash absorbing members 17a and 17b will be described with reference to FIGS. 4A and 4B.

First, as for the connection between the metallic protective cover 17x and the resinous backlash absorbing member 17y, it is also preferable to fold the tip portion of the cap-shaped accommodating portion 17xa (see FIG. 3) after inserting the cylindrical-shaped resinous backlash absorbing member 17y into the cap-shaped accommodating portion 17xa of the metallic protective cover 17x. This is because it is possible to prevent the resinous backlash absorbing member 17y from falling and improve the mobility of the backlash absorbing members 17a and 17b in the spindle 11 and the stress absorbability in the backlash absorbing members 17a and 17b as a result of the folding.

In addition, although the constituent material of the metallic protective cover 17x is not particularly limited, the material is preferably at least one of aluminum, copper, nickel, iron, and the like in that the material is lightweight, inexpensive, and capable of obtaining predetermined deformability and durability.

In the case of this embodiment, the resin of the resinous backlash absorbing member 17 is made of nylon resin and the metallic protective cover 17x is made of aluminum alloy. These materials are more preferable because the materials are excellent in workability and compatibility with another member in terms of coefficient of thermal expansion and so on.

Second Embodiment

The stage mechanism of the second embodiment includes a predetermined micro head as illustrated in FIG. 5.

The micro head 10 can be incorporated into and used in various types of equipment requiring a micro head, examples of which include a micrometer and a stage mechanism. Further, the backlash reduction effect of the spindle of the invention can be obtained in the equipment. A stage mechanism including the micro head 10 of the invention will be described below.

1. Basic Configuration

Figure 5A:
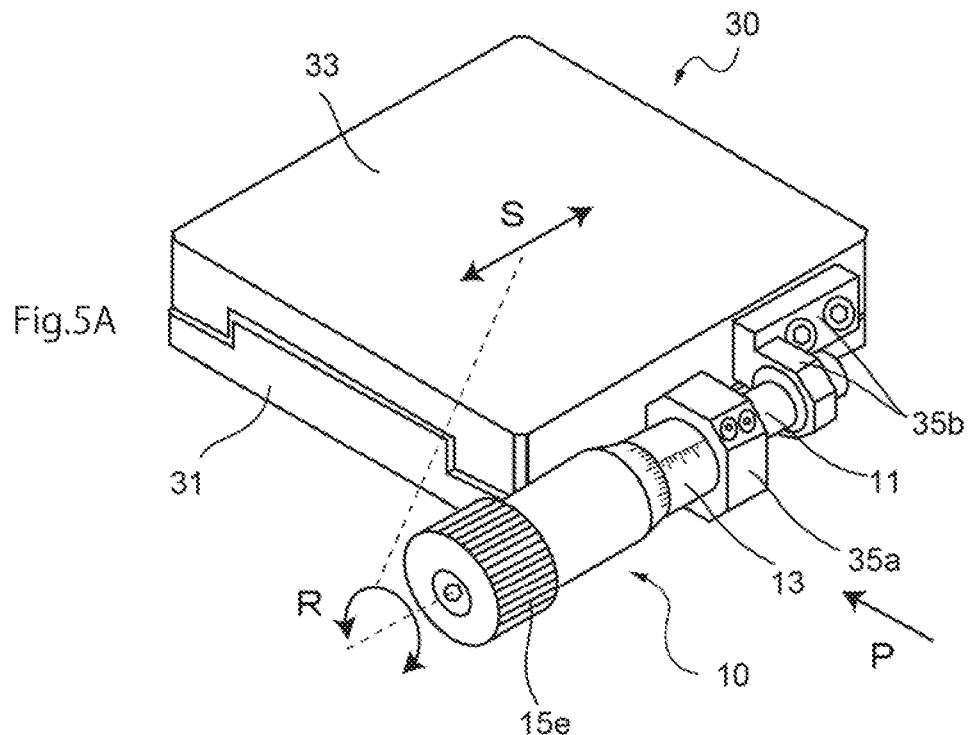
FIG. 5A is a perspective view illustrating a stage mechanism as an example of use of the micro head of the embodiment.
Figure 5B:
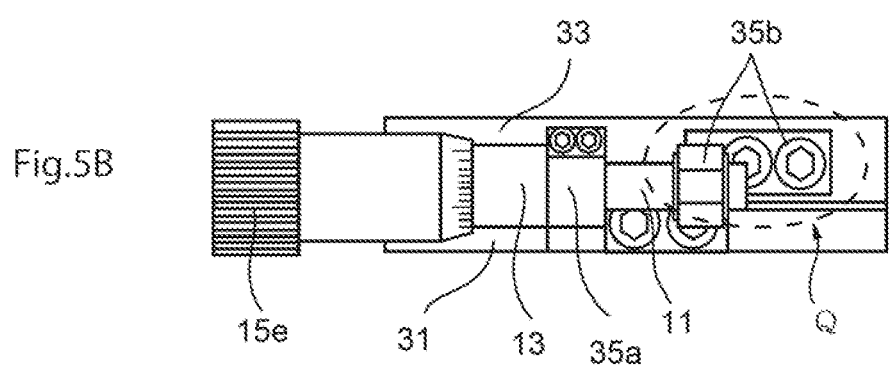
FIG. 5B is a side view of the stage mechanism.

FIG. 5A is a perspective view of a stage mechanism 30 including the micro head 10, and FIG. 5B is a side view of the stage mechanism 30 seen from the P direction in FIG. 5A.

The stage mechanism 30 includes the micro head 10, a fixed stage 31, a movable stage 33, guide members 31a and 33a, a first connection portion 35a, and a second connection portion 35b.

The fixed stage 31 is a base member of the stage mechanism 30. The movable stage 33 is a member provided on the fixed stage 31. The movable stage 33 moves on the fixed stage 31 in the guide direction of the guide members 31a and 33a in accordance with the operation of the micro head 10.

Each of the fixed stage 31 and the movable stage 33 in this case has a quadrangular planar shape, the same size as each other, and a predetermined thickness. It is a matter of course that the shape, size, and thickness of each of the fixed stage 31 and the movable stage 33 are determined in accordance with the specifications of the stage mechanism.

The fixed stage 31 and the movable stage 33 are, for example, aluminum (including alumite-treated aluminum), copper, brass, iron, nickel, magnesium, tungsten, ceramic, polymer resin materials, or the like. The alumite-treated aluminum is excellent in, for example, lightness, corrosion resistance, durability, workability, thermal conductivity, decorativeness, and economy. Accordingly, the alumite-treated aluminum is particularly suitable as a constituent material of the fixed stage 31 and the movable stage 33.

2. Guide Member

Figure 6A:
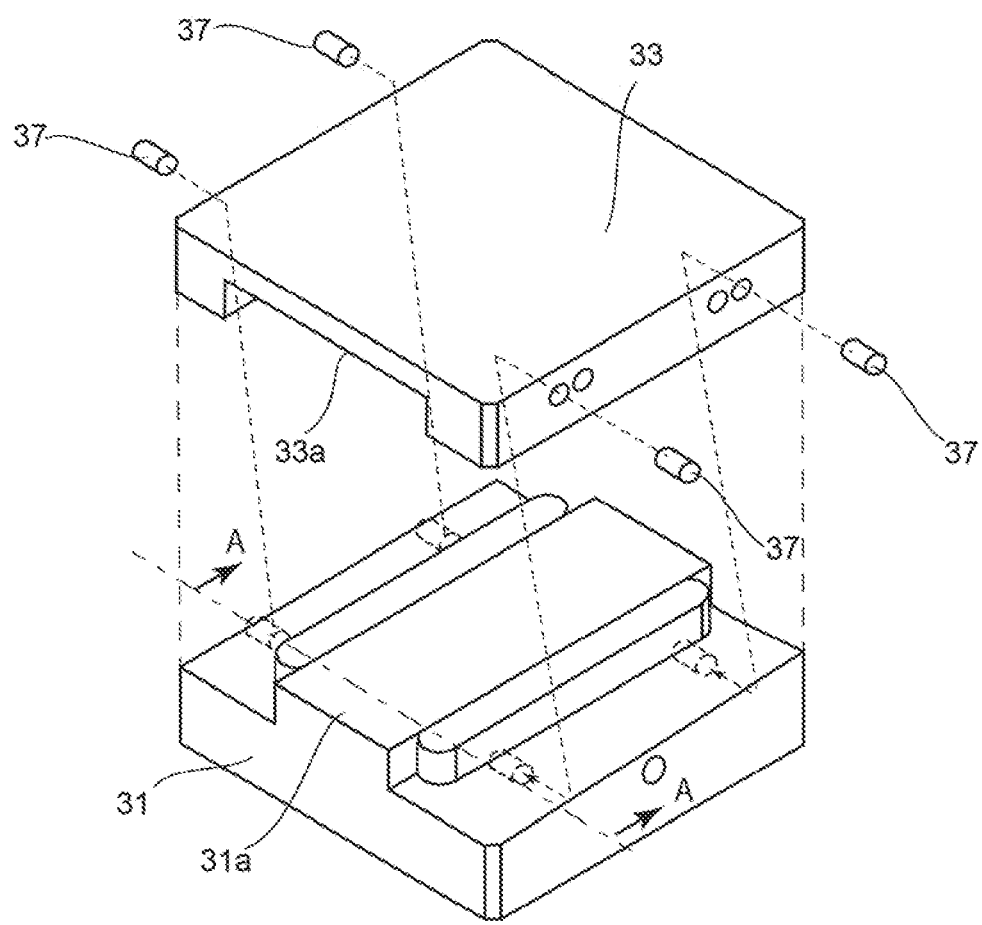
FIG. 6A is an exploded perspective view focusing on a guide rail structure of the stage mechanism.
Figure 6B:
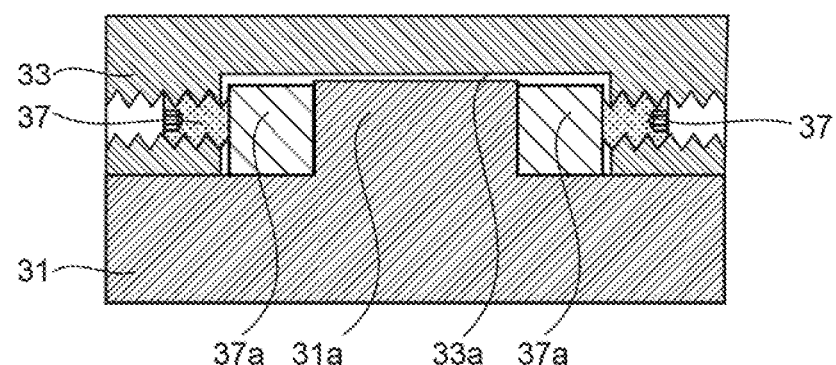
FIG. 6B is a cross-sectional view taken along line A-A in FIG. 6A.
Figure 6C:
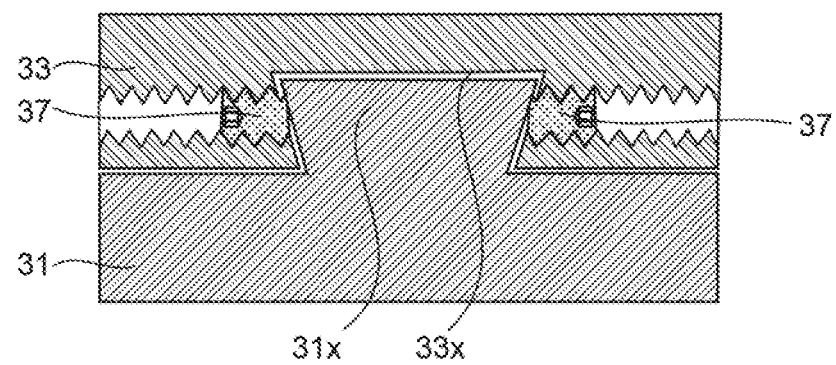
FIG. 6C is a cross-sectional view of another guide rail structure.
Figure 7:
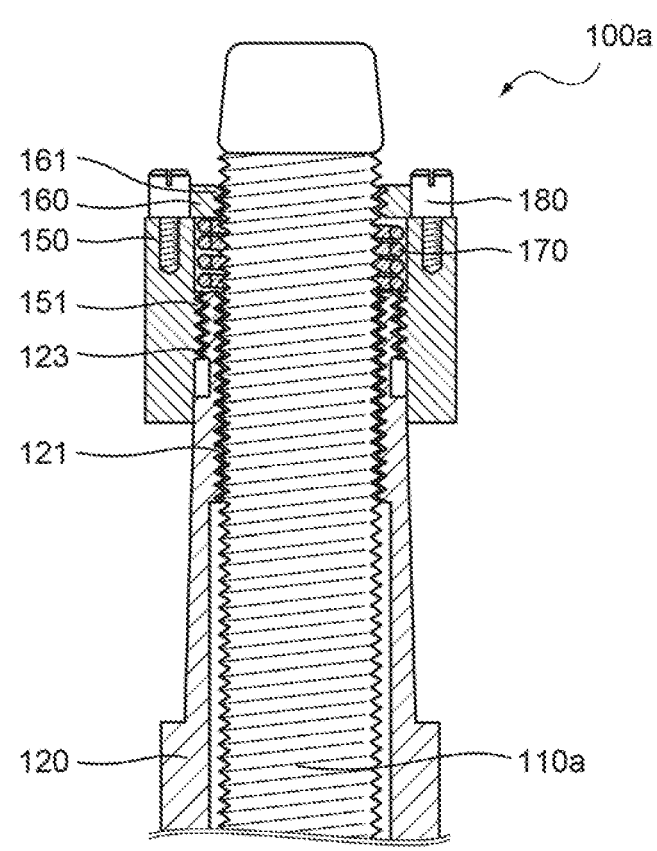
FIG. 7 is a cross-sectional view of a micro head of the related art.
Figure 8A:
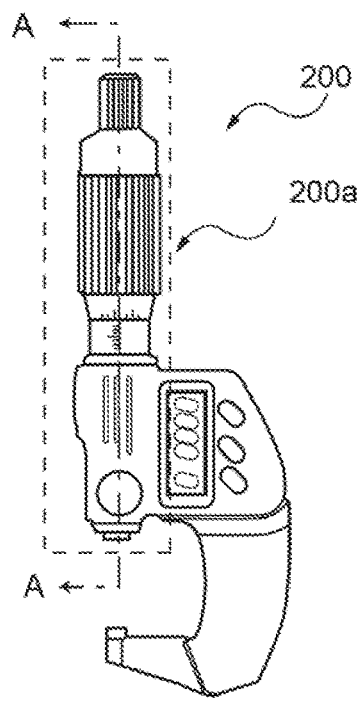
FIG. 8A is a plan view of a micrometer of the related art.
Figure 8B:
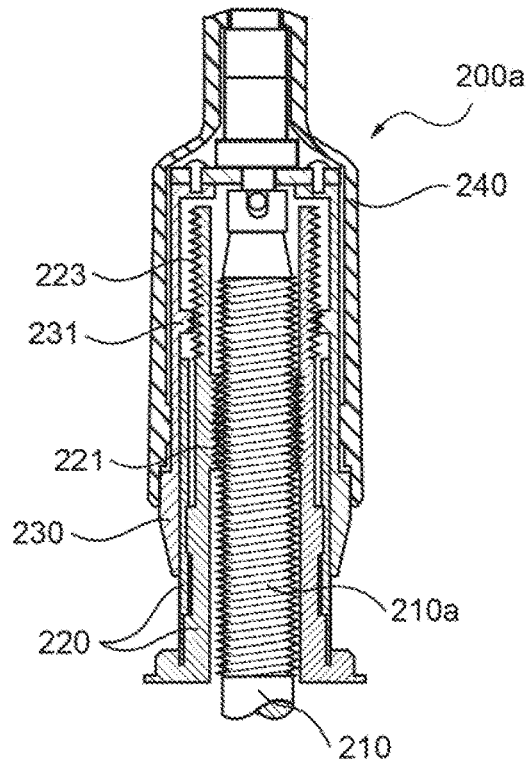
FIG. 8B is a cross-sectional view of a micro head of the related art.

Next, the guide members 31a and 33a will be described with reference to FIGS. 6A to 6C. FIG. 6A is a perspective view for understanding the connection relationship of the fixed stage 31, the movable stage 33, the guide member 31a, and a guide member 31b. FIG. 6B is a cross-sectional view taken along line A-A in FIG. 6A. FIG. 6C is a cross-sectional view for describing another guide member.

The guide member 31a in this case is one projecting portion in which a part of the fixed stage 31 has the same length as one side of the fixed stage 31 and protrudes above the fixed stage 31. On the other hand, the guide member 33a is a recess portion provided at a part of the fixed stage 31 so as to correspond to the projection of the guide member 31a and a guide rail 37a.

The projecting portion and the recess portion are fitted together, the guide rail 37a is pressed through a hole provided in the movable stage 33 from the side surface of the movable stage 33 to the guide rail 37a, and the side surface of the guide member 31a is moderately pressed by a fixing screw 37 (see FIG. 6B). In this structure, the movable stage 33 is capable of moving on the fixed stage 31 along the guide members 31a and 33a.

It should be noted that the structure of the guide member is not limited to the above example and may be another structure. For example, although the guide members 31a and 31b are one set in FIGS. 6A and 6B, it is preferable that two sets of the guide members 31a and 31b are provided in parallel in the guide member. In addition, it is also preferable that the guide member uses dovetail groove structures 31x and 33x as illustrated in FIG. 6C.

This is because the number of components such as the guide rail can be reduced and manufacturing can be facilitated and inexpensive.

In addition, although not illustrated, it is also preferable that the guide rail 37a is replaced with an endless track-type guide or a finite track-type guide such as predetermined cross roller and ball guides.

This is because friction entailed by a movement of the movable stage 33 can be reduced and a force at a time when the spindle is rotated can be weakened.

3. First Connection Portion and Second Connection Portion

Next, the first connection portion 35a and the second connection portion 35b will be described with reference to FIG. 5.

One end of the first connection portion 35a is fixed to one side surface of the fixed stage 31, and the other end of the first connection portion 35a is fixed to the sleeve 13 of the micro head 10.

In addition, one end of the second connection portion 35b is fixed to one side surface of the movable stage 33 and the other end of the second connection portion 35b is fixed to the spindle 11 of the micro head 10. However, the one side surface of the fixed stage 31 and the one side surface of the movable stage 33 are the closest side surfaces in the relationship in which the surfaces are perpendicularly positioned. Each of the first connection portion 35a and the second connection portion 35b may be any suitable structure.

Figure 5C:
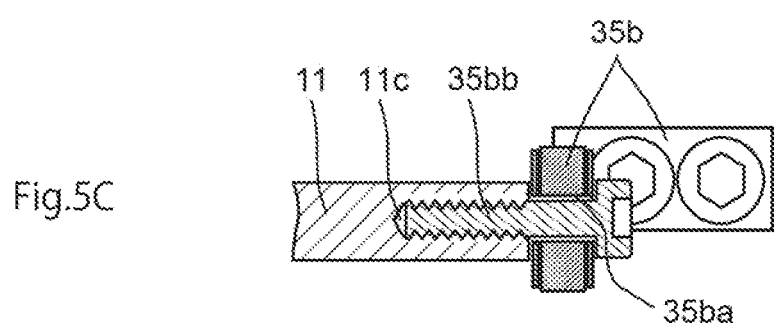
FIG. 5C is a partial cross-sectional view describing a main portion of a second connection portion.

However, in the case of this embodiment, the second connection portion 35b is the structure that is illustrated in FIG. 5C. In addition, the part that is illustrated in FIG. 5C is a diagram illustrating a part of the Q part in FIG. 5B as a cross-sectional view.

Specifically, a screw hole 11c is provided in the axial direction of the spindle 11 in the tip portion of the spindle 11.

In addition, a through hole 35ba is provided at a position of the second connection portion 35b along the axis of the spindle 11. A screw portion member 35bb is turned into the screw hole 11c of the spindle 11 by means of the screw portion member 35bb passing through the through hole 35ba, and then screw loosening is prevented by means of an adhesive such as a screw lock. Here, it is preferable that the outer diameter of the part of the screw portion member 35bb corresponding to the through hole 35ba is smaller than the inner diameter of the through hole 35ba by a value within the range of 0.01 to 1 mm as a predetermined tolerance.

It is possible to satisfactorily transmit a movement of the spindle 11 to the movable stage 33 with the configuration of the second connection portion 35b.

4. Effect

The micro head 10, the fixed stage 31, and the movable stage 33 are connected by the first connection portion 35a and the second connection portion 35b. Accordingly, when the operation knob 15e of the micro head 10 is rotated left and right as indicated by the arrow R in FIG. 5A, the spindle 11 moves forward and backward along the axial direction. In response to the forward-backward movement, the movable stage 33 moves forward and backward in the direction along the arrow S in FIG. 5A.

Further, the backlash reduction effect of the spindle 11 in the invention is exhibited as follows in the stage mechanism 30.

In other words, although repulsive stress causing the movable stage 33 of the stage mechanism 30 to return is generated as a reaction to the pressing force that is attributable to a rotational movement of the spindle 11, the repulsive stress can be efficiently absorbed and the backlash in the movable stage 33 can be reduced by the backlash absorbing members 17a and 17b being moderately deformed.

Further, the backlash absorbing members 17a and 17b are sufficiently solidified after the movable stage 33 is fixed at a predetermined position.

Accordingly, in the case of the backlash absorbing members 17a and 17b illustrated in FIGS. 4A to 4C, the external stress that is applied to the spindle 11 from the left side in the drawing can be efficiently absorbed by the left backlash absorbing member 17a and the external stress that is applied to the spindle 11 from the right side in the drawing can be efficiently absorbed by the right backlash absorbing member 17b. As a result, the backlash of the movable stage 33 can be reduced also in the stage mechanism 30.

INDUSTRIAL APPLICABILITY

As described above, according to the invention, backlash can be extremely reduced even with a simple structure by the spindle, the sleeve, the thimble, and the backlash absorbing member fixed to the sleeve being provided.

Accordingly, the invention is expected to be widely used in many industrial fields such as precision measuring instruments, machining apparatuses, and optical instruments requiring precise and fine workpiece movement functions.

For example, in a case where the invention is installed at the four corners of the top plate of a laboratory table or the like and used for balance adjustment, lock work for positional reconfirmation after the adjustment of each height is not necessary, and thus equilibration is expected to be expedited.

In addition, in a case where the invention is installed at the rotating gear part of an optical lens or a mirror and used for angle adjustment, it is expected that the shake at a time when a person releases his or her hand after performing laser oscillation direction or mirror adjustment by moving the knob is extremely reduced.

In addition, even in a case where the invention is installed in a vacuum chamber of an electron microscope or the like and used for triaxial stage position adjustment, outgas generated from the resin is expected to be effectively trappable and damage to a pump for vacuumization is expected to be prevented by the metal protective cover wrapping the resin part.

Further, even in a case where the invention is used for the purpose of sensor or lens component positioning for an artificial satellite, cosmic rays, or the like, outgas diffusion is expected to be suppressed and adhesion to the surface of the lens or the like is expected to be prevented.

The invention claimed is:

1. A stage mechanism comprising:
   a fixed stage;
   a movable stage provided on the fixed stage;
   a micro head for moving the movable stage on the fixed stage;
   a first connection portion connecting a sleeve of the micro head and the fixed stage; and
   a second connection portion connecting a spindle of the micro head and the movable stage, wherein
   one end of the first connection portion is fixed to one side surface of the fixed stage and the other end of the first connection portion is fixed to the sleeve of the micro head,
   one end of the second connection portion is fixed to one side surface of the movable stage and the other end of the second connection portion is fixed to the spindle of the micro head,
   each of the fixed stage and the movable stage has a quadrangular planar shape, and
   the micro head includes configurations of (1) to (6):
   (1) the spindle having a male screw portion;
   (2) the sleeve incorporating the spindle;
   (3) a thimble where a part of the sleeve is inserted, the thimble being rotatable about the sleeve about an axis of rotation and partially connected to one end of the spindle;
   (4) a cylindrical backlash absorbing member fixed to the sleeve in a state where the spindle is inserted in the sleeve at a position facing the male screw portion of the spindle, the backlash absorbing member being a resinous member including a through hole having a predetermined diameter allowing penetration by the spindle;
   (5) a collar having a role as a shaft shake prevention member of the spindle, the collar being provided in the sleeve and fixed to the sleeve, the collar being in contact with the backlash absorbing member, the collar and the backlash absorbing member being disposed in this order from a tip side of the spindle, the tip side of the spindle being the one end of the spindle that is not connected to the thimble; and
   (6) a metallic protective cover which is provided on a periphery of the backlash absorbing member, the metallic protective cover covering both axial ends of the backlash absorbing member, the metallic protective cover including an accommodating portion accommodating the backlash absorbing member and a screw portion having a screw groove corresponding to the male screw portion of the spindle.

2. The stage mechanism according to claim 1, wherein the backlash absorbing member is fixed to the sleeve by an anaerobic adhesive.

3. The stage mechanism according to claim 1, wherein two or more units of the backlash absorbing member are provided.

4. The stage mechanism according to claim 3, wherein the two or more backlash absorbing members are continuously disposed along the spindle.

5. The stage mechanism according to claim 3, wherein the two or more backlash absorbing members are spaced apart from each other.

6. The stage mechanism according to claim 1, wherein the second connection portion includes a screw hole provided in a tip portion of the spindle, a member having a through hole having a predetermined diameter and fixed to the movable stage, and a screw member having a diameter smaller by a predetermined tolerance than the predetermined diameter and screwed into the screw hole through the through hole.

7. A stage mechanism comprising:
   a fixed stage;
   a movable stage provided on the fixed stage;
   a micro head for moving the movable stage on the fixed stage;
   a first connection portion connecting a sleeve of the micro head and the fixed stage; and
   a second connection portion connecting a spindle of the micro head and the movable stage, wherein
   one end of the first connection portion is fixed to one side surface of the fixed stage and the other end of the first connection portion is fixed to the sleeve of the micro head,
   one end of the second connection portion is fixed to one side surface of the movable stage and the other end of the second connection portion is fixed to the spindle of the micro head,
   each of the fixed stage and the movable stage has a quadrangular planar shape, and
   the micro head includes configurations of (1) to (6):
   (1) the spindle having a male screw portion;
   (2) the sleeve incorporating the spindle;
   (3) a thimble where a part of the sleeve is inserted, the thimble being rotatable about the sleeve about an axis of rotation and partially connected to one end of the spindle;
   (4) a cylindrical backlash absorbing member fixed to the sleeve in a state where the spindle is inserted in the sleeve at a position facing the male screw portion of the spindle, the backlash absorbing member being a resinous member including a through hole having a predetermined diameter allowing penetration by the spindle;
   (5) a collar having a role as a shaft shake prevention member of the spindle, the collar being provided in the sleeve and fixed to the sleeve, the collar being in contact with the backlash absorbing member, the collar and the backlash absorbing member being disposed in this order from a tip side of the spindle, the tip side of the spindle being the one end of the spindle that is not connected to the thimble; and
   (6) a metallic protective cover is provided on a periphery of the backlash absorbing member, the metallic protective cover covering both axial ends of the backlash absorbing member, the metallic protective cover including an accommodating portion accommodating the backlash absorbing member and a screw portion having a screw groove corresponding to the male screw portion of the spindle,
   two or more units of the backlash absorbing member are provided, and the two or more backlash absorbing members are continuously disposed along the spindle to create a space portion as a grease reservoir surrounded by the two or more backlash absorbing member, the metallic protective cover and the spindle.

8. The stage mechanism according to claim 7, wherein the second connection portion includes a screw hole provided in a tip portion of the spindle, a member having a through hole having a predetermined diameter and fixed to the movable stage, and a screw member having a diameter smaller by a predetermined tolerance than the predetermined diameter and screwed into the screw hole through the through hole.

* * * * *